(12) United States Patent
Broos et al.

(10) Patent No.: US 8,546,517 B2
(45) Date of Patent: Oct. 1, 2013

(54) POLY(BISOXALAMIDES)

(75) Inventors: Rene Broos, Bornem (BE); Niels Jurrian Sijbrandi, Enschede (NL); Pieter Jelle Dijkstra, Borne (NL); Jan Feijen, Hengelo (NL)

(73) Assignee: Dow Global Technologies LLC

( * ) Notice: Subject to any disclaimer, the term of this patent is extended or adjusted under 35 U.S.C. 154(b) by 315 days.

(21) Appl. No.: 12/965,471

(22) Filed: Dec. 10, 2010

(65) Prior Publication Data

US 2011/0152494 A1    Jun. 23, 2011

Related U.S. Application Data

(60) Provisional application No. 61/288,894, filed on Dec. 22, 2009.

(51) Int. Cl.
*B32B 5/16* (2006.01)
(52) U.S. Cl.
USPC ......... 528/343; 528/288; 528/324; 528/329.1
(58) Field of Classification Search
USPC .................................. 528/292, 310, 335, 343
See application file for complete search history.

(56) References Cited

U.S. PATENT DOCUMENTS

| | | | |
|---|---|---|---|
| 4,119,615 A | 10/1978 | Schulze | |
| 4,133,803 A | 1/1979 | Klein | |
| 4,178,432 A * | 12/1979 | Chen et al. | 528/340 |
| 5,783,657 A | 7/1998 | Pavlin et al. | |
| 5,998,570 A | 12/1999 | Pavlin et al. | |
| 6,172,167 B1 | 1/2001 | Stapert et al. | |
| 6,268,466 B1 | 7/2001 | MacQueen et al. | |
| 6,399,713 B1 | 6/2002 | MacQueen et al. | |
| 6,552,160 B2 | 4/2003 | Pavlin | |
| 6,956,099 B2 | 10/2005 | Pavlin | |
| 6,960,248 B2 | 11/2005 | Pavlin | |
| 2008/0214743 A1 | 9/2008 | Broos et al. | |
| 2008/0262618 A1 | 10/2008 | Hermsen et al. | |
| 2010/0041292 A1 | 2/2010 | Kim et al. | |
| 2010/0041857 A1 | 2/2010 | Harris et al. | |
| 2010/0126341 A1 | 5/2010 | Matteucci et al. | |
| 2010/0126342 A1 | 5/2010 | Lopez et al. | |
| 2010/0127434 A1 | 5/2010 | Broos et al. | |
| 2010/0129591 A1 | 5/2010 | Lopez et al. | |
| 2010/0129634 A1 | 5/2010 | Lopez et al. | |
| 2010/0129641 A1 | 5/2010 | Lopez et al. | |
| 2010/0137478 A1 | 6/2010 | White et al. | |

FOREIGN PATENT DOCUMENTS

| | | |
|---|---|---|
| EP | 2036939 A1 | 3/2009 |
| GB | 1140463 | 9/1966 |
| JP | 59193923 | 8/1984 |
| WO | 9113113 A1 | 9/1991 |

(Continued)

OTHER PUBLICATIONS

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-182.

(Continued)

*Primary Examiner* — Nathan M Nutter
*Assistant Examiner* — Timothy Meagher

(57) ABSTRACT

The present invention generally relates to a poly(bisoxalamide) and a process for preparing and article comprising the poly(bisoxalamide).

4 Claims, 4 Drawing Sheets

(56) References Cited

FOREIGN PATENT DOCUMENTS

| | | | |
|---|---|---|---|
| WO | 9113930 | A1 | 9/1991 |
| WO | 2008102127 | A2 | 8/2008 |
| WO | 2008112833 | A1 | 9/2008 |
| WO | 2008113992 | A2 | 9/2008 |
| WO | 2008150970 | A2 | 12/2008 |
| WO | 2009134824 | A2 | 11/2009 |

OTHER PUBLICATIONS

Koevoets et al., "Molecular Recognition in a Thermoplastic Elastomer", Journal of the American Chemical Society, 2005, pp. 2999-3003, vol. 127.

Lips et al., "Incorporation of different crystallizable amide blocks in segmented poly(ester amide)s", Polymer, 2005, pp. 7834-7842, vol. 46, Elsevier Ltd.

Lips et al., "Synthesis and characterization of poly(ester amide)s containing crystallizable amide segments", Polymer, 2005, pp. 7823-7833, vol. 46, Elsevier Ltd.

Makarevic et al., "Gels with exceptional thermal stability formed by bis(amino acid) oxalamide gelators and solvents of low polarity", Chemical Communications, 2002, vol. 19, pp. 2238-2239, The Royal Society of Chemistry.

Sijakovic-Vujicic et al., "Transcription of Gel Assemblies of Bola Type Bis(oxalamide)-dicarboxylic acid and -diester Gelators into Silica Nanotubes and Ribbons under Catalyzed and Non-catalyzed Conditions", Croatica Chemica Acta, 2007, vol. 80 No. 3-4, pp. 591-598.

* cited by examiner

POLY(BISOXALAMIDES)

CROSS-REFERENCE TO RELATED APPLICATIONS

This application claims benefit from U.S. Provisional Patent Application No. 61/288,894, filed Dec. 22, 2009, the entire contents of which are hereby incorporated herein by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention generally relates to a poly(bisoxalamide) and a process for preparing and article comprising the poly(bisoxalamide).

2. Description of the Related Art

Thermoplastic elastomers can be characterized as being polymers that combine elastic properties of an elastomer and processability characteristics of a thermoplastic material. Chemical and material industries desire such a combination of properties and characteristics, but many polymers have elastic properties and not thermoplastic characteristics and other polymers have thermoplastic characteristics and not elastic properties.

U.S. Pat. No. 4,119,615 mentions, among other things, a certain polyoxalamide that is useful as a thermoplastic adhesive. The polyoxalamide is prepared by first reacting a certain polyoxypropylene polyamine with oxalic acid to give a liquid prepolymer comprising residuals thereof, and then reacting the liquid prepolymer with a certain diamine to give the polyoxalamide. Also mentioned is that it is important that the sequence of reactions be followed as just described, namely first the preparation of a prepolymer followed by further reaction with a diamine to produce the final polyoxalamide. U.S. Pat. No. 4,119,615 mentions the polyoxypropylene polyamine is a diamine, triamine, or a mixture thereof, having an average molecular weight of about 190 to 3,000. The polyoxypropylene diamine is of the formula:

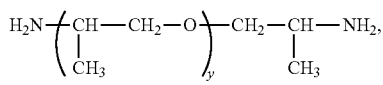

wherein y is a number of from 2 to 40, whereas the diamine that is reacted with the liquid prepolymer is of a different formula, the latter diamine being of the formula: $H_2N$—$(C_2$-$C_{18})$hydrocarbon diradical —$NH_2$.

Patent Publication Number WO 91/13930 A1 mentions, among other things, a certain segmented block copolymer comprising non-crystallizable segments and partly crystallizable segments, the partly crystallizable segments being of a certain structural formula as described therein. The segmented block copolymer is not a polyoxalamide and does not comprise residuals of oxalic acid.

Patent Publication Number US 2008/0262618 A1 mentions, among other things, a biocompatible segmented thermoplastic elastomer having crystallizable blocks and at least one functional component that is able to reversibly bond to the crystallized blocks, wherein the elastomer has cartilage regenerative properties. The segmented thermoplastic elastomer is not a polyoxalamide and does not comprise residuals of oxalic acid, but is a thermoplastic elastomeric polyurethane.

Patent Publication Number WO 2008/150970 mentions, among other things, molecularly self-assembling material that is a copolymer that can be, among other things, a polyester-amide, polyether-amide, polyester-urethane, polyetherurethane, polyether-urea, polyester-urea, or a mixture thereof.

Chemical and material industries desire new thermoplastic elastomeric polymers that have elastic properties of an elastomer and processability characteristics of a thermoplastic material. Preferably, the new thermoplastic elastomeric polymers possess improved properties such as, for example, being easily, and preferably reversibly, melt processable and yet exhibiting toughness and durability at application use temperatures.

BRIEF SUMMARY OF THE INVENTION

The present invention provides, among other things, an invention poly(bisoxalamide) that in some embodiments is characterizable as a thermoplastic elastomer. The present invention also provides, among other things, a process for preparing the invention poly(bisoxalamide) and articles comprising the invention poly(bisoxalamide).

In a first embodiment, the present invention is a poly(bisoxalamide) comprising a plurality of repeat units of formula (I):

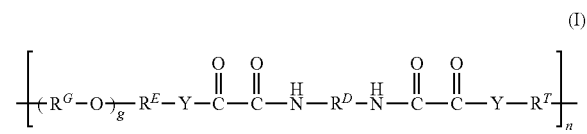

wherein for each repeat unit:
  g independently is an integer of from 0 to 40 (when g is 0, —$R^G$—O— is absent);
  $R^G$ independently is —$(CH_2)_m$— or —$(CHR^1)_m$—, where m is an integer of from 2 to 4 and $R^1$ is $(C_1$-$C_{10})$hydrocarbyl; or —$[C(=O)—(CH_2)_b]$— where b is an integer 3 or 5; or —$[C(=O)$-A-$C(=O)$—O-D]— where A is a residual of a dicarboxylic acid and D is a residual of a diol;
  Each of $R^E$ and $R^T$ is a diradical residual of an alpha-amino acid, beta-amino acid, gamma-amino acid, or alpha, omega-amino acid having from 5 to 40 carbon atoms;
  $R^D$ independently is a diradical residual of an alpha, omega-diamine of from 2 to 40 carbon atoms;
  Y independently is O or N(H); and
  n is an integer of 2 or higher, the integer n indicating a total number of the repeat units comprising the poly(bisoxalamide).

In a second embodiment, the present invention is a process for preparing the poly(bisoxalamide) of the first embodiment, the process comprising:

contacting an oxalic acid monomer, preferably oxalic acid diethyl ester, with a first diamine monomer, the first diamine monomer being of formula (A) or (B):

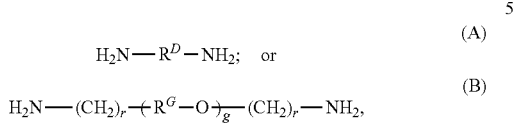

wherein $R^D$, $R^G$, and g are as defined for formula (I) and r is an integer of from 2 to 4, the contacting being under condensation reaction conditions and preparing an intermediate bis(oxalic acid hemiamide-hemiester); and contacting the intermediate bis(oxalic acid hemiamide-hemiester) with ingredient (a), (b), (c), or (d):
  ingredient (a) comprising two mole equivalents of a monoamine monomer of formula (C): RO—$R^{ET}$—$NH_2$ (C), wherein RO— is a leaving group (e.g., alkoxy) and $R^{ET}$ is —C(=O)—CH($R^1$)— or —C(=O)—$CH_2CH_2$;
  ingredient (b) comprising a diol monomer of formula

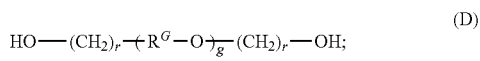

ingredient (c) comprising a second diamine monomer of the aforementioned formula (A); and
  ingredient (d) comprising a mixture of ingredients (a) and (b);
  ingredient (a), (b), or (d) being employed when the first diamine monomer is of formula (A) and ingredient (c) being employed when the first diamine monomer is of formula (B); the contacting being under polymerization conditions and preparing the poly(bisoxalamide) of the first embodiment. In ingredient (b), variable groups r, $R^G$, and g independently are as defined previously for formula (I).

In a third embodiment, the present invention is an article comprising the poly(bisoxalamide) of the first embodiment.

The invention poly(bisoxalamide) can be prepared by the process of the second embodiment and is useful in preparing or comprising the article of the fourth embodiment.

The invention poly(bisoxalamide) is especially useful in, for example, foams, films, coatings, hot melt adhesives, fibers, fabrics, and articles comprising same, including extruded and molded articles, which comprise additional aspects of the present invention.

Additional embodiments are described in accompanying drawing(s) and the remainder of the specification, including the claims.

BRIEF DESCRIPTION OF THE DRAWING(S)

Some embodiments of the present invention are described herein in relation to the accompanying drawing(s), which will at least assist in illustrating various features of the embodiments.

DETAILED DESCRIPTION OF THE INVENTION

Figure 1:
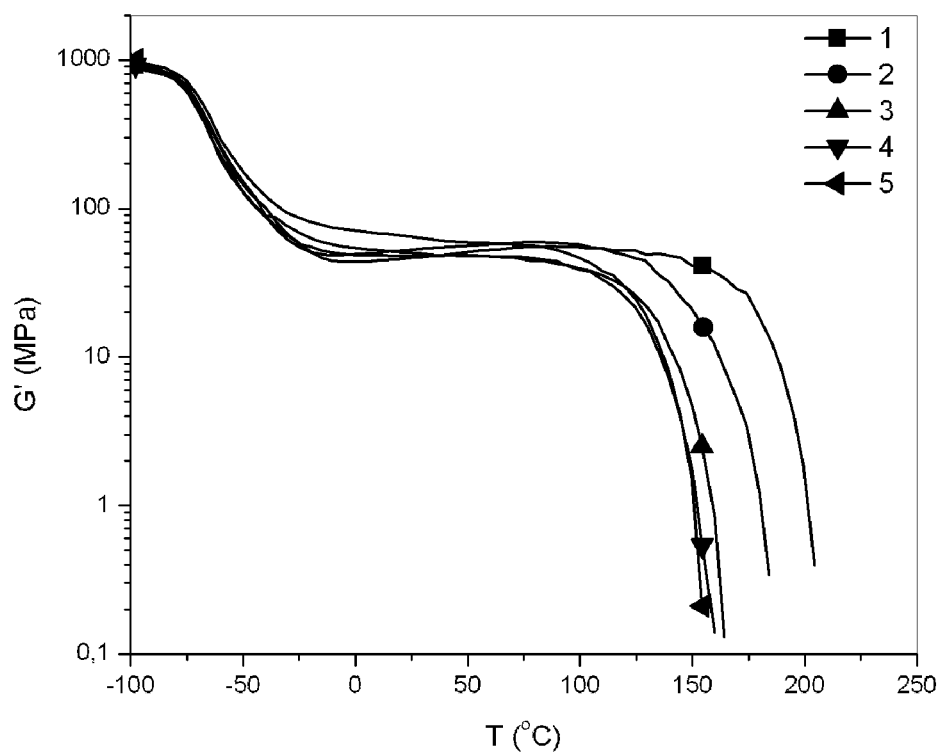
FIG. 1 shows torsional (dynamic) storage modulus (G') curves for the poly(bisoxalamides) (1) to (5).

For purposes of United States patent practice and other patent practices allowing incorporation of subject matter by reference, the entire contents—unless otherwise indicated—each U.S. patent, U.S. patent application, U.S. patent application publication, PCT international patent application and WO publication equivalent thereof, referenced in the instant Summary or Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," meaning of "about" can be construed from context of its use. Preferably "about" means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "plurality" means two or more, wherein each plurality is independently selected unless indicated otherwise. The symbols "≤" and "≥" respectively mean less than or equal to and greater than or equal to. The symbols "<" and ">" respectively mean less than and greater than.

As used herein, the term "$(C_1-C_{10})$hydrocarbyl" means a hydrocarbon radical of from 1 to 10 carbon atoms, wherein each hydrocarbon radical independently is aromatic or non-aromatic, saturated or unsaturated, straight chain or branched chain, cyclic (including mono- and poly-cyclic, fused and non-fused polycyclic) or acyclic, or a combination of two or more thereof; and each hydrocarbon radical is the same as or different from another hydrocarbon radical. The term "saturated" means lacking carbon-carbon double bonds, carbon-carbon triple bonds, and (in heteroatom-containing groups) carbon-nitrogen, carbon-phosphorous, and carbon-silicon double bonds.

Preferably, a $(C_1-C_{10})$hydrocarbyl independently is an unsubstituted or substituted $(C_1-C_{10})$alkyl, $(C_3-C_{10})$cycloalkyl, $(C_3-C_6)$cycloalkyl-$(C_1-C_4)$alkylene, $(C_6-C_{10})$aryl, or $(C_6)$aryl-$(C_1-C_4)$alkylene. More preferably, each of the aforementioned groups independently has a maximum of 7 carbon atoms (e.g., $(C_1-C_7)$alkyl, $(C_3-C_{70})$cycloalkyl, $(C_3-C_6)$cycloalkyl-$(C_1)$alkylene, $(C_6)$aryl, or $(C_6)$aryl-$(C_1)$alkylene), still more preferably 4 carbon atoms (e.g., $(C_1-C_4)$alkyl).

The term "$(C_1-C_{10})$alkyl" means a saturated straight or branched hydrocarbon radical of from 1 to 10 carbon atoms that is unsubstituted or substituted by one or more chloro or fluoro. Examples of unsubstituted $(C_1-C_{10})$alkyl are $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{10})$alkyl are substituted $(C_1-C_5)$alkyl and trifluoromethyl.

The term "$(C_6-C_{10})$aryl" means an unsubstituted or substituted (by one or more $R^S$) mono- or bi-cyclic aromatic hydrocarbon radical of from 6 to 10 total carbon atoms, of which at least from 6 are ring carbon atoms, and the mono- or bicyclic radical comprises 1 or 2 rings, wherein the 2 rings independently are fused or non-fused and at least 1 of the 2 rings is aromatic. Examples of unsubstituted $(C_6-C_{10})$aryl are unsubstituted $(C_6)$aryl; phenyl; indenyl; and naphthyl. Examples of substituted $(C_6-C_{10})$aryl are substituted $(C_6)$aryl; and pentafluorophenyl.

The term "$(C_3-C_{10})$cycloalkyl" means a saturated cyclic hydrocarbon radical of from 3 to 10 carbon atoms that is unsubstituted or substituted by one or more halo or unsubstituted $(C_1-C_3)$alkyl. Examples of unsubstituted $(C_3-C_{10})$cycloalkyl are unsubstituted $(C_3-C_6)$cycloalkyl, cyclopropyl, cyclobutyl, cyclopentyl, cyclohexyl, cycloheptyl, cyclooctyl, cyclononyl, and cyclodecyl. Examples of substituted $(C_3-C_{10})$cycloalkyl are substituted $(C_3-C_{60})$cycloalkyl, cyclopentanon-2-yl, and 1-fluorocyclohexyl.

The term "$(C_1-C_{10})$heterohydrocarbyl" means a heterohydrocarbon radical of from 1 to 10 carbon atoms and one or more heteroatoms N (when comprising =N—); O; S; S(O); S(O)$_2$; and N($R^N$), wherein independently each $R^N$ is unsubstituted $(C_1-C_3)$alkyl.

Preferably, a $(C_1-C_{10})$heterohydrocarbyl independently is unsubstituted or substituted $(C_1-C_{10})$heteroalkyl, $(C_2-C_{10})$heterocycloalkyl, $(C_2-C_5)$heterocycloalkyl-$(C_1-C_4)$alkylene, $(C_3-C_5)$cycloalkyl-$(C_1-C_3)$heteroalkylene, $(C_2-C_5)$heterocycloalkyl-$(C_1-C_3)$heteroalkylene, $(C_1-C_{10})$heteroaryl, $(C_1-C_5)$heteroaryl-$(C_1-C_4)$alkylene, $(C_6)$aryl-$(C_1-C_3)$heteroalkylene, or $(C_1-C_5)$heteroaryl-$(C_1-C_3)$heteroalkylene.

Examples of unsubstituted $(C_1-C_{10})$heteroalkyl are aminomethyl, hydroxymethyl, dimethylsulfon-1-yl, 2-ethoxyethyl, 3-azapentane, and 1,6-diaminohexan-1-yl.

Examples of unsubstituted $(C_2-C_{10})$heterocycloalkyl are aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thia-cyclononyl, and 2-aza-cyclodecyl.

Examples of unsubstituted $(C_1-C_{10})$heteroaryl are unsubstituted $(C_1-C_9)$heteroaryl, unsubstituted $(C_1-C_5)$heteroaryl, pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; tetrazol-5-yl; pyridine-2-yl; pyrimidin-2-yl; pyrazin-2-yl; indol-1-yl; benzimidazole-1-yl; quinolin-2-yl; and isoquinolin-1-yl.

Preferably, there are no O—O, S—S, or O—S bonds, other than O—S bonds in an S(O) or S(O)$_2$ diradical functional group, in the metal complex of formula (I).

In some embodiments, the invention poly(bisoxalamide) comprises a plurality of repeat units of formula (I) wherein Y is N(H); $R^E$ independently is —C(=O)—CH($R^1$)— and $R^T$ is —CH($R^1$)—C(=O)—, where $R^1$ is as defined for formula (I), that is the invention poly(bisoxalamide) comprises a plurality of repeat units of formula (Ia):

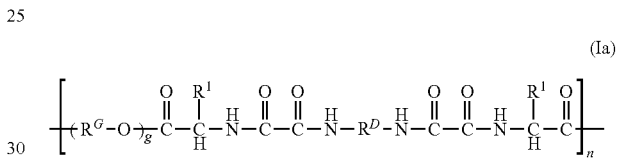

(Ia)

wherein n, $R^G$, g, $R^1$, and $R^D$ are as defined for formula (I). In some embodiments, $R^1$ is hydrogen. In some embodiments, $R^1$ is $(C_1-C_{10})$hydrocarbyl. In some embodiments, $R^1$ is $(C_1-C_{10})$heterohydrocarbyl.

In some embodiments, $R^1$ is characterizable as being a $(C_1-C_{10})$hydrocarbyl or $(C_1-C_{10})$heterohydrocarbyl, the $(C_1-C_{10})$hydrocarbyl or $(C_1-C_{10})$heterohydrocarbyl being formally derived from a side chain of a naturally-occurring amino acid. In such embodiments, preferably $R^1$ is methyl (from alanine); 1-methylethyl (from valine); 2-methylpropyl (from leucine); 1-methylpropyl (from isoleucine); —CH$_2$OH (from serine); 1-hydroxyethyl (from threonine); —CH$_2$COOH (from aspartic acid); —CH$_2$CH$_2$COOH (from glutamic acid); —CH$_2$CONH$_2$ (from asparagine); —CH$_2$CH$_2$CONH$_2$ (from glutamine); —CH$_2$—(imidazol-4yl) (from histidine); —(CH$_2$)$_4$NH$_2$ (from lysine); —(CH$_2$)$_4$N(H)C(=NH)NH$_2$ (from arginine); —CH$_2$SH (from cysteine); —CH$_2$CH$_2$SCH$_3$ (from methionine); —CH$_2$phenyl (from phenylalanine); —CH$_2$(4-hydroxyphenyl) (from tyrosine); —CH$_2$(indol-1H-3-yl) (from tryptophan); or $R^1$ is taken together with the carbon atom to which it is bonded and adjacent nitrogen atom to form a pyrrolidin-1,2-diyl (from proline).

In some embodiments, the invention poly(bisoxalamide) comprises a plurality of repeat units of formula (I) wherein Y is N(H); $R^E$ is —C(=O)—CH$_2$CH$_2$— and $R^T$ is —CH$_2$CH$_2$—C(=O)—, that is the invention poly(bisoxalamide) comprises a plurality of repeat units of formula (Ib):

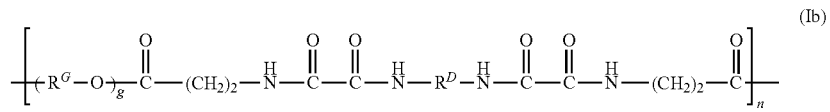

(Ib)

wherein n, $R^G$, g, and $R^D$ are as defined for formula (I).

The term "diradical residual of an alpha,omega-amino acid" means an aliphatic or alicyclic diradical of 2 to 40 carbons, hydrogen atoms, and from 0 to 8 heteroatoms, each heteroatom being S, O, or N, the aliphatic or alicyclic diradical being formally (hypothetically) derivable by removing the HO— from the alpha end of the alpha,omega-amino acid and the —$NH_2$ from the omega end of the alpha,omega-amino acid.

In some embodiments each of $R^E$ and $R^T$ is the diradical residual of an alpha-amino acid. Preferably in the diradical residual of an alpha-amino acid, $R^E$ is —C(=O)—CH($R^1$)— and $R^T$ is —CH($R^1$)—C(=O)—, where $R^1$ is hydrogen, ($C_1$-$C_{10}$)hydrocarbyl, or ($C_1$-$C_{10}$)heterohydrocarbyl.

In some embodiments each of $R^E$ and $R^T$ is the diradical residual of a beta-amino acid. Preferably in the diradical residual of a beta-amino acid, $R^E$ is —C(=O)—$CH_2CH_2$— and $R^T$ is —$CH_2CH_2$—C(=O)—.

In some embodiments each of $R^E$ and $R^T$ is the diradical residual of a gamma-amino acid. Preferably in the diradical residual of a gamma-amino acid, $R^E$ is —C(=O)—CH($R^1$)CH($R^1$)CH($R^1$)— and $R^T$ is —CH($R^1$)CH($R^1$)CH($R^1$)—C(=O)—, where each $R^1$ independently is hydrogen, ($C_1$-$C_{10}$)hydrocarbyl, ($C_1$-$C_{10}$)heterohydrocarbyl.

In some embodiments each of $R^E$ and $R^T$ is the diradical residual of an alpha,omega-amino acid having from 5 to 40 carbon atoms. Preferably in the diradical residual of an alpha,omega-amino acid having from 5 to 40 carbon atoms, $R^E$ is —C(=O)—$(CH_2)_p$— and $R^T$ is —$(CH)_p$—C(=O)—, where p is an integer of from 4 to 20.

In some embodiments, p is an integer of from 2 to 4. In some embodiments, p is 2. In some embodiments, p is 3. In some embodiments, p is 4. In some embodiments, p is an integer of from 5 to 7. In some embodiments, p is 5. In some embodiments, p is 6. In some embodiments, p is 7. In some embodiments, p is an integer of from 8 to 10. In some embodiments, p is 8. In some embodiments, p is 9. In some embodiments, p is 10.

In some embodiments, the invention poly(bisoxalamide) comprises a plurality of repeat units of formula (I) wherein Y is N(H); each $R^E$ and $R^T$ is —$(CH_2)_r$—, where r is as defined for formula (I), that is the invention poly(bisoxalamide) comprises a plurality of repeat units of formula (Ic):

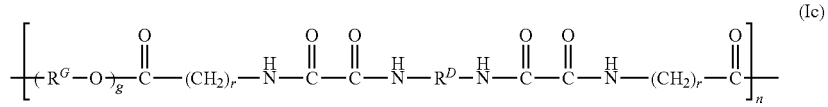

wherein n, $R^G$, g, and $R^D$ are as defined for formula (I) and r is an integer of from 2 to 4. In some embodiments, r is 2. In some embodiments, r is 3. In some embodiments, r is 4.

In some embodiments $R^G$ is —$(CH_2)_m$—. In some embodiments $R^G$ is —$(CHR^1)_m$—. In some embodiments $R^G$ is —[C(=O)—$(CH_2)_b$]—. In some embodiments $R^G$ is —[C(=O)-A-C(=O)—O-D]-. In such embodiments m, $R^1$, b, A, and D are as defined previously for formula (I). In some embodiments $R^G$ is a residual of (a) a nonvolatile (i.e., boiling point >150° C.) diol such as a higher glycol (e.g., dipropylene glycol or tripropylene glycol), polybutylene glycol, polypropylene glycol, polyethylene glycol (PEG, e.g., PEG of molecular weight 400 g/mol to 8000 g/mol), or ethylene oxide (EO) capped polypropylene glycol of molecular weight 400 g/mol to 4000 g/mol; a dimer diol; soybean-derived polyol; or other high molecular weight (i.e., >200 g/mol) natural diol such as those mentioned in Jetter et al. Phytochemistry 55, 169-176 (2000); (b) a commercial polyester diol such as, for example, a polycaprolactone diol of molecular weight (Mn) 530 g/mol to 2000 g/mol and polybutylene adipate diol of molecular weight Mn about 1000 g/mol; or (c) hydroxyl functionalized polybutadiene of molecular weight (Mn) 1200 g/mol to 2800 g/mol. In some embodiments —($R^G$—O)$_g$— comprises a polypropyleneoxide or polybutyleneoxide.

In some embodiments, the invention poly(bisoxalamide) comprises a plurality of repeat units of formula (I) wherein g independently is an integer of from 1 to 10. In some embodiments, g is an integer of from 1 to 10. In some embodiments, g is an integer of from 11 to 20. In some embodiments, g is an integer of from 21 to 30. In some embodiments, g is an integer of from 31 to 40. In some embodiments, g is 1. In some embodiments, g is 2, 3, or 4. In some embodiments, g is an integer of from 5 to 7. In some embodiments, g is an integer of from 8 to 10. In some embodiments, g is 11.

In some embodiments, m is 2. In some embodiments, m is 3. In some embodiments, m is 4.

The term "diradical residual of an alpha,omega-diamine of from 2 to 40 carbon atoms" means an aliphatic of alicyclic diradical of from 2 to 40 total carbon, hydrogen atoms, and from 0 to 8 heteroatoms, each heteroatom being S, O, or N, the aliphatic of alicyclic diradical being formally (hypothetically) derivable from the alpha,omega-diamine by removing the alpha end and omega end —$NH_2$ groups therefrom. Preferably the diradical residual of an alpha,omega-diamine is —$(CH_2)_k$—, where k is an integer of from 2 to 12 (i.e., from 1,2-diaminoethane to 1,12-diaminododecane).

In some embodiments, $R^D$ is —$(CH_2)_2$—, —$(CH_2)_4$—, —$(CH_2)_6$—, —$(CH_2)_8$—, or —$(CH_2)_{10}$—. In some embodiments, $R^D$ is —$(CH_2)_3$—, —$(CH_2)_5$—, —$(CH_2)_7$—, or —$(CH_2)_9$—. In some embodiments, $R^D$ is —$(CH_2)_2$—. In some embodiments, $R^D$ is —$(CH_2)_4$—. In some embodiments, $R^D$ is —$(CH_2)_6$—. In some embodiments, $R^D$ is —$(CH_2)_8$—. In some embodiments, $R^D$ is —$(CH_2)_{10}$—.

In some embodiments, n is an integer of from 2 to 100.

In some embodiments, the poly(bisoxalamide) of formula (I) is characterizable as having a crystallizable bisoxalamide segment (so-called hard segment). In some embodiments, the poly(bisoxalamide) of formula (I) is further characterizable as also having (a) a non-crystallizable segment (so-called soft segment) or (b) a potentially crystallizable soft segment. An example of the non-crystallizable segment is a poly(propylene oxide) segment. An example of the potentially crystallizable soft segment is a poly(tetramethylene oxide) segment.

In some embodiments, the poly(bisoxalamide) of formula (I) having the crystallizable bisoxalamide segment is further characterizable as having a melting temperature ($T_m$) of from 110 degrees Celsius (° C.) to 210° C., and more preferably from 111° C. to 202° C., as determined by Differential Scanning calorimetry (DSC) as described later.

Preferably, the crystallizable segment comprises a bisoxalamide residual of formula (H):

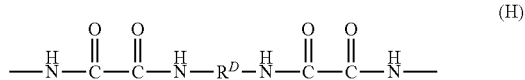

wherein $R^D$ is as defined in formula (I). In some embodiments, the crystallizable segment further comprises $R^E$, that is the crystallizable segment comprises a bisoxalamide residual of formula ($H^E$):

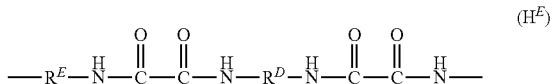

wherein $R^D$ is as defined for formula (I); and $R^E$ is —C(=O)—CH($R^1$)—, where $R^1$ is as defined for formula (I); or $R^E$ is —C(=O)—CH$_2$CH$_2$.

Preferably, the non-crystallizable segment and the potentially crystallizable soft segment comprises an ether or polyether of formula (S)

wherein $R^G$ is as defined for formula (I) and g is an integer of from 1 to 40. In some embodiments, the non-crystallizable segment further comprises $R^E$, that is the non-crystallizable segment comprises an ether or polyether of formula ($S^E$):

wherein $R^G$ is as defined for formula (I), $R^E$ is —(CH$_2$)$_r$—, and g is an integer of from 1 to 40. The $T_m$ of the bisoxalamide residual of formula (H)>>$T_m$ of the ether or polyether of formula (S).

In some embodiments, the poly(bisoxalamide) of formula (I) is characterizable as having a crystallizable content (including contribution of the hard segment) of from 10 weight percent (wt %) to 30 wt %, and more preferably from 10.5 wt % to 26.9 wt %, as determined by calculating the weight ratio of the crystallizable segment content in the polymer chain. For example, the bisoxalamide residual of formula (HS):

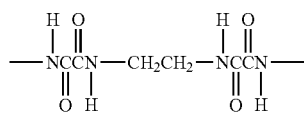

wherein formula (HS) is an example of the hard segment, has a molecular weight of 200 g/mol and the bisoxalamide residual (1)+($R^G$—O)$_g$ has a molecular weight of 1300 g/mol. The crystallisable segment content with contribution of hard segment is then calculated by a mathematical formula:

((weight of bisoxalamide residual(HS))/(weight of bisoxalamide residual(HS)+weight of ($R^G$—O)$_g$))×100, and is expressed in wt %, wherein "×" means times(i.e., multiplication).

In some embodiments, the poly(bisoxalamide) of formula (I) is characterizable as having a crystallizable segment (i.e., hard segment) content of from 15 mole percent (mol %) to 25 mol %.

In some embodiments, the poly(bisoxalamide) of formula (I) is characterizable as having a number average molecular weight ($M_n$) of from 10,000 grams per mole (g/mol) to 70,000 g/mol, and more preferably from 21,000 g/mol to 63,000 g/mol, and still more preferably from 22,700 g/mol to 41,200 g/mol, as measured by Gel Permeation Chromatography (GPC) as described later.

In some embodiments, the poly(bisoxalamide) of formula (I) is characterizable as having a polydispersity index value (PDI) of from 1.5 to 2.5, and more preferably from 1.8 to 2.3, as determined by GPC. In some embodiments, the poly (bisoxalamide) of formula (I) having the crystallizable segment is further characterizable as having a PDI of from 8.5 to 10.5, and more preferably from 8.65 to 10.28, as determined by GPC.

In some embodiments, the poly(bisoxalamide) of formula (I) is characterizable as having an ordered oxalamide hydrogen bonding absorbance of 0.45 or greater at a wavenumber of 1651 reciprocal centimeters (cm$^{-1}$) at 70° C. (and in some embodiments also at 100° C. or 120° C.) as determined by Fourier Transform Infrared Spectroscopy (FT-IR) as described later. In some embodiments, the poly(bisoxalamide) of formula (I) is characterizable as comprising a plurality of polymer chains, adjacent ones of the polymer chains being reversibly cross-linked to each other via the ordered oxalamide hydrogen bonds so as to form supra-molecular ribbons, each supra-molecular ribbon comprising two such cross-linked polymer chains.

In some embodiments, the poly(bisoxalamide) of formula (I) is characterizable as having a percent crystallinity (%) of from 70% to 90%, and more preferably from 79% to 90%, as determined by FT-IR as described later.

In some embodiments, the poly(bisoxalamide) of formula (I) is characterizable as having a torsional (dynamic) storage modulus (G') of from 10 megaPascals (MPa) to 80 MPa %, and more preferably from 12 MPa to 79 MPa, at 25° C. as determined by Dynamic Mechanical Analysis (DMA) as described later.

In some embodiments, the invention poly(bisoxalamide) has elastic properties of an elastomer and processability characteristics of a thermoplastic material. Preferably, the invention poly(bisoxalamide) possesses improved properties such as, for example, being easily, and preferably reversibly, melt processable and yet exhibiting toughness and durability at application use temperatures.

Materials and Methods

Abbreviations bt (broad triplet); d (doublet); H (hydrogen atom); m (multiplet); q (quartet); s (singlet); t (triplet);

Compression Molding Procedure

Instrument: Hot press (THB 008, Fontijne Holland BV, the Netherlands)

Procedure 1: compression mold at 190° C. for 3 minutes at a pressure of 300 bar (30,000 kiloPascals (kPa)).

Procedure 2: compression mold at 180° C. for 4 minutes without pressure and then 3 minutes at a pressure of 300 kiloNewtons (kN).

Differential Scanning Calorimetry (DSC) method:

Instrument: Perkin-Elmer Pyris 1

Procedure: Perform measurements on compression molded polymers. In a first heating scan, heat samples (5 mg to 10 mg each) from 25° C. to 250° C. at a first heating rate of 20° C./minute; anneal for 5 minutes; cool to −100° C. at a cooling rate of 20° C./minute; and subsequently in a second heating scan heat from −100° C. to 250° C. at a second heating rate of 20° C./minute. Obtain melting ($T_m$) and crystallization ($T_c$) temperatures from peak maxima, and determine melt enthalpy ($\Delta H_m$) and crystallization enthalpy ($\Delta H_c$) from the area under the curve. Present results using data taken from the second heating scan.

Dynamic Mechanical Analysis (DMA)

Instrument: Myrenne ATM3 torsion pendulum

Procedure for determining mechanical properties (e.g., dynamic (torsional) storage modulus G': Perform differential mechanical analysis using at a frequency of approximately 1 Hertz (Hz). Measure storage modulus (G') and loss modulus (G") as functions of temperature. First cool samples (50 mm×10 mm×2 mm) cooled to −100° C., and then heat them at a heating rate of 1° C./minute. Define the temperature at which the loss modulus reaches a maximum value as the glass transition temperature ($T_g$). Define the flow temperature ($T_{flow}$) as the temperature at which the storage modulus reaches 1 MPa.

Compression set: Polymer samples (10 mm×10 mm×2 mm) cut from compression molded bars are placed between two metal plates at 25° C. (ASTM 395 B standard) a compressed to 75% of their original thickness for 24 hours, and then load is released. Determine sample thickness 30 minutes after the load is released. Calculate compression set (CS) using formula: $CS=(d_0-d_2)/(d_0-d_1)\times 100\%$, where $d_0$, $d_1$ and $d_2$ are the sample thicknesses before, during and after compression, respectively.

Tensile Testing

Instrument: Zwick Z020 universal tensile machine equipped with a 500 Newtons (N) load cell and extensometers Procedure: Conduct tensile tests with compression molded bars cut to dumbbells (ISO37 type 2). Use a Zwick Z020 universal tensile machine equipped with a 500 N load cell and extensometers to measure the stress as a function of strain at a strain rate of 0.4 per second (test speed of 60 mm/minute) and a preload of 0.1 MPa.

Fourier Transform Infrared Spectroscopy (FT-IR)

Instrument and procedure for determining absorbance at 1651 cm-1 and percent crystallinity:

Prepare a film of polymer being analyzed. Record Fourier Transform Infra-red spectra on a Thermo 5700 spectrometer utilizing a DTGS detector at 4 cm-1 resolution. Control temperature of the prepared polymer film between sodium chloride windows by an infrared cell from Spectra Tech (model 0019-019). Collect data between 4000 cm-1 and 500 cm-1 employing 16 scans. Analyze the carbonyl region of each of the infrared spectra in terms of free (1685 cm-1), H-bonded (1670 cm-1), and ordered (1650 cm-1) amide structures. Determine percent crystallinity as the relative intensity I of the ordered amide absorption versus the total amide intensity×100% as shown in the following equation:

$$\frac{I(1650)}{I(1650)+I(1670)+I(1685)}\times 100\%.$$

Gel Permeation Chromatography (GPC) Method

Instrument and procedure for determining $M_n$:

The GPC setup consists of a Perkin Elmer series 200 binary pump, a Perkin Elmer series 200 autosampler, a Shimadzu CTO-AVP column oven, and a Shimadzu RID-10A refractive index detector. Set flow rate at 1 mL/minute with mixed-solvent chloroform/hexafluoroisopropanol (95/5 volume/volume). Use an injection volume of 200 microliters μL. Perform a separation on two PL Mixed-D columns (300 millimeters (mm)×7.5 mm) from Polymer Laboratories Ltd., packed with 5-1 μm sized particles. Temperature of the columns is 30° C. Calibrate the system with 14 narrow polystyrene standards (Polymer Laboratories) with molecular weight MW ranging from 580 g/mol to 1,000,000 g/mol.

Crystallizable segment content method: Determine crystallizable segment content in wt % as described previously.

Nuclear Magnetic Resonance (NMR) spectroscopy Instrument: Varian Inova Nuclear Magnetic Resonance Spectrometer

PREPARATIONS

Preparation 1

Preparation of a Telechelic Oligomer, bis(oxalic acid hemiamide-hemiester) (P1)

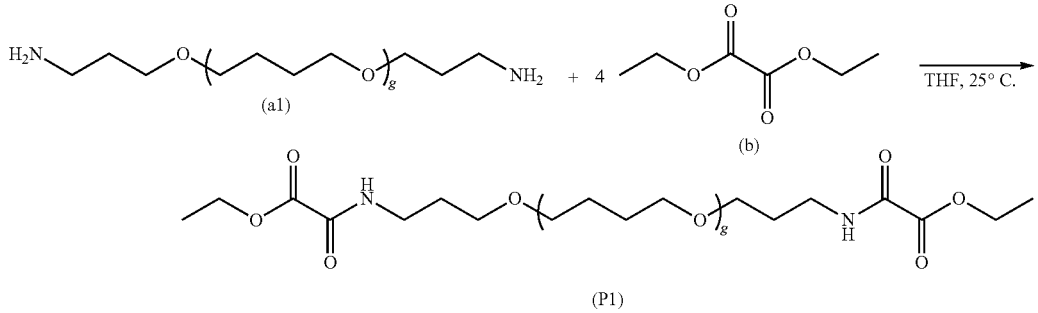

Add a 4 mole equivalent excess of diethyl oxalate (53.1 g; 0.36 mol; (b)) to a solution of bis(3-aminopropyl)-terminated polytetrahydrofuran (100 g; 0.09 mol—Chemical Abstracts Registry Number (CAS RegNo.) 72088-96-1; $M_n$ is about 1,100 g/mol; average g=11; (a1)) in tetrahydrofuran (500 mL; THF) at room temperature; stir the resulting mixture for 15 hours; remove THF under reduced pressure; and place the remaining material in vacuo (pressure <1 millibar, i.e., <0.1 kilopascal (kPa)) while heating it at 70° C. for 16 hours to give (P1), wherein average g=11, as a yellow viscous liquid (slowly solidifies); yield 100%. $^1$H NMR (300 MHz, CDCl$_3$-d$_1$) δ=7.73 (bt, 2H, NHCO), 4.32 (m, 4H, CH$_3$CH$_2$O), 3.54 (t, 4H, NHCH$_2$CH$_2$CH$_2$O), 3.30-3.40 (m, 54H, OCH$_2$CH$_2$), 3.30-3.40 (m, 4H, NHCH$_2$CH$_2$CH$_2$O), 1.81 (m, 4H, NHCH$_2$CH$_2$CH$_2$O), 1.50-1.70 (m, 54H, OCH$_2$CH$_2$), 1.31 (t, 6H, CH$_3$CH$_2$O).

Preparation 2

Preparation of diethyl 2,2'-(hexane-1,6-diylbis(azanediyl))bis(2-oxoacetate), a bis(oxalic acid hemiamide-hemiester) (P2)

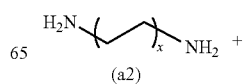

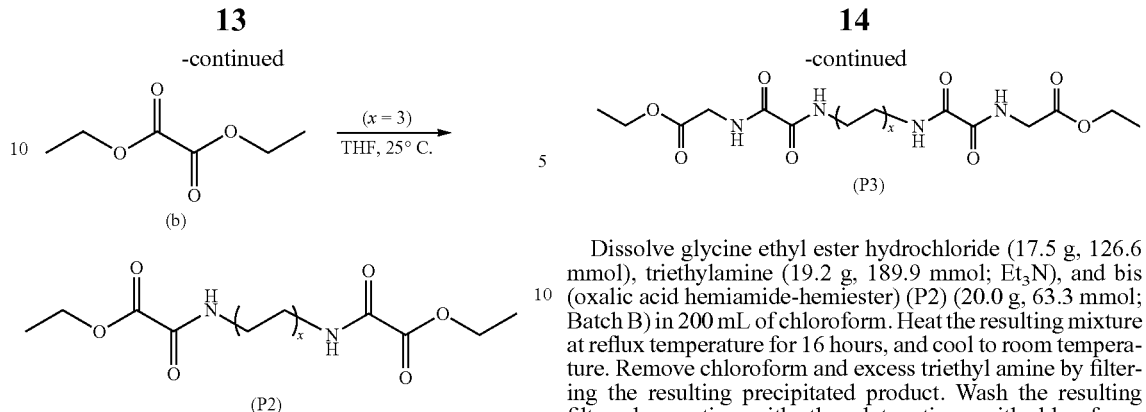

Repeat the procedure of Preparation 1 to prepare another batch of (P2) except for the changes that follow: use 10 mole equivalents of diethyl oxalate (629.4 g, 4.31 mol; (b)) and 1,6-hexanediamine (50.0 g, 0.43 mol) (a2)) instead of (a1) in 200 mL THF, and stir for 16 hours. Filter the resulting suspension to give a first filtercake. Dissolve the first filtercake in chloroform, filter, and remove chloroform from the resulting filtrate to give a second filtercake. Wash the second filtercake with diethyl ether, and dry in vacuo to give (P2) as a white powder; 80% yield; m.p. 90° C. $^1$H-NMR (300 MegaHertz (MHz), CDCl$_3$) δ in parts per million (ppm): 7.25 (bt, 2H), 4.33 (q, 4H), 3.32 (t, 4H), 1.53 (m, 4H), 1.36 (m, 4H), 1.36 (t, 6H).

Preparation 3

Preparation of a bis(oxalic acid hemiamide-hemiester) (P3)

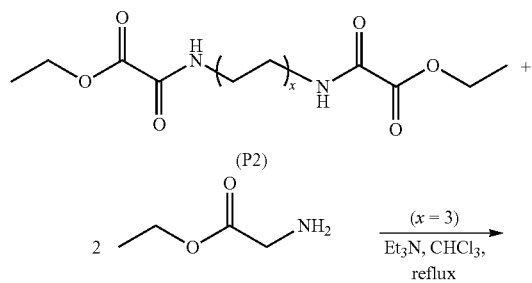

Dissolve glycine ethyl ester hydrochloride (17.5 g, 126.6 mmol), triethylamine (19.2 g, 189.9 mmol; Et$_3$N), and bis(oxalic acid hemiamide-hemiester) (P2) (20.0 g, 63.3 mmol; Batch B) in 200 mL of chloroform. Heat the resulting mixture at reflux temperature for 16 hours, and cool to room temperature. Remove chloroform and excess triethyl amine by filtering the resulting precipitated product. Wash the resulting filtercake one time with ethanol, two times with chloroform, and two times with diethyl ether, and dry in vacuo, thereby obtaining (P3) as a white powder (yield 73%, m.p. 190° C.). $^1$H-NMR (300 MHz, trifluoroacetic acid-d1 (TFA-d1)): δ in ppm: 4.50 (q, 4H), 4.40 (d, 4H), 3.56 (t, 4H), 1.79 (m, 4H), 1.55 (m, 4H), 1.47 (t, 6H).

EXAMPLE(S) OF THE PRESENT INVENTION

Non-limiting examples of the present invention are described below. In some embodiments, the present invention is as described in any one of the examples.

Examples 1 to 5

Preparation of Poly(Bisoxalamides) (1) to (5)

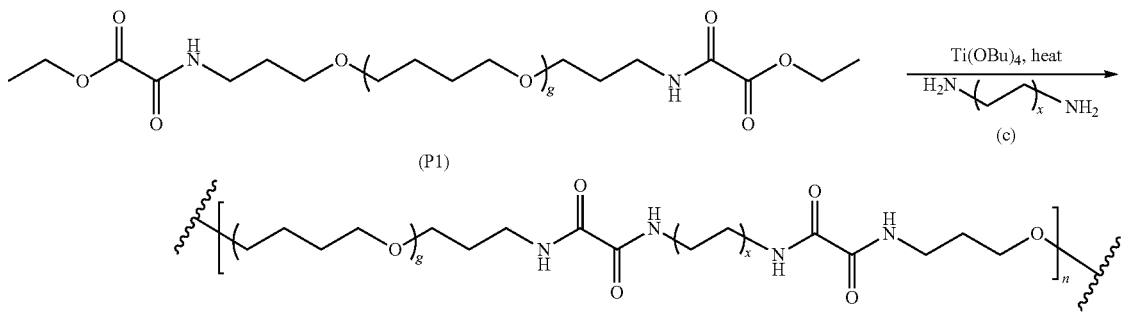

(1): x = 1; (2): x = 2; (3): x = 3 (4): x = 4; (5): x = 5 wherein ∼∼∼ denotes a radical and integer n independently indicates a total number of the repeat units comprising the poly(bisoxalamide) (1) to (5).

Obtain 5 lots of bis(oxalic acid hemiamide-hemiester) (P1) (30 g, 0.023 mol; Preparation 1), and combine a different one of the lots with an equal mole amount of one of the following diamines: ethylene diamine (for Example 1); 1,4-butanediamine (for Example 2); 1,6-hexanediamine (2.68 g, 0.023 mol; for Example 3); 1,8-octanediamine (for Example 4); or 1,10-decanediamine (for Example 5) in a different one of 5 polymerization tubes. To each of the resulting premixtures add 0.2% by weight (calculated on the amount of (P1)) of titanium tetra(normal-butoxide) Ti(OBu)$_4$ and IRGANOX™ 1330 from Ciba Geigy Corporation (1% by weight based on total reaction mass). Heat the resulting reaction mixture to 190° C. under nitrogen flow, and after 1 hour reduce pressure to 20 mbar. Distill off produced ethanol, collecting it in a cold trap. Subsequently place in vacuo for 4 hours at a temperature of 240° C. (for Example 1), 210° C. (for Example 2), or 190° C. (for each of Examples 3 to 5); final pressure is 0.08 mbar. Cool the reaction mixture to room temperature under vacuum. Dissolve the resulting polymer in 200 mL chloroform at 50° C. for 4 hours and, and add the resulting solution to 2 liters (L) of chilled (5° C.) diethyl ether. Filter off resulting precipitated polymer, and dry the filtercake at room temperature under reduced pressure to separately give each of poly(bisoxalamides) (1) to (5):

poly(bisoxalamide) (1): $^1$H NMR (300 MHz, TFA-$d_1$) δ=3.78 (t, 4H, NHCH$_2$CH$_2$CH$_2$O), 3.60-3.75 (m, 54H, OCH$_2$CH$_2$), 3.60-3.75 (m, 4H, NHCH$_2$CH$_2$CH$_2$O), 3.51 (t, 4H, CONHCH$_2$), 2.01 (m, 4H, NHCH$_2$CH$_2$CH$_2$O), 1.70-1.80 (m, 54H, OCH$_2$CH$_2$);

poly(bisoxalamide) (2): $^1$H NMR (300 MHz, CDCl$_3$-$d_1$) δ=7.83 (bt, 2H, OCH$_2$CH$_2$CH$_2$NHCO), 7.54 (bt, 2H, CONHCH$_2$CH$_2$), 3.48 (t, 4H, NHCH$_2$CH$_2$CH$_2$O), 3.30-3.50 (m, 54H, OCH$_2$CH$_2$), 3.30-3.50 (m, 4H, NHCH$_2$CH$_2$CH$_2$O), 3.30 (t, 4H, CONHCH$_2$CH$_2$), 1.80 (m, 4H, NHCH$_2$CH$_2$CH$_2$O), 1.60-1.70 (m, 54H, OCH$_2$CH$_2$), 1.60 (m, 4H, CONHCH$_2$CH$_2$CH$_2$);

poly(bisoxalamide) (3): $^1$H NMR (300 MHz, CDCl$_3$-$d_1$) δ=7.83 (bt, 2H, OCH$_2$CH$_2$CH$_2$NHCO), 7.48 (bt, 2H, CONHCH$_2$CH$_2$CH$_2$), 3.49 (t, 4H, NHCH$_2$CH$_2$CH$_2$O), 3.30-3.50 (m, 54H, OCH$_2$CH$_2$), 3.30-3.50 (m, 4H, NHCH$_2$CH$_2$CH$_2$O), 3.30 (t, 4H, CONHCH$_2$CH$_2$CH$_2$), 1.79 (m, 4H, NHCH$_2$CH$_2$CH$_2$O), 1.60-1.70 (m, 54H, OCH$_2$CH$_2$), 1.59 (m, 4H, CONHCH$_2$CH$_2$CH$_2$), 1.33 (m, 4H, CONHCH$_2$CH$_2$CH$_2$);

poly(bisoxalamide) (4): $^1$H NMR (300 MHz, CDCl$_3$-$d_1$) δ=7.83 (bt, 2H, OCH$_2$CH$_2$CH$_2$NHCO), 7.47 (bt, 2H, CONHCH$_2$CH$_2$CH$_2$CH$_2$), 3.49 (t, 4H, NHCH$_2$CH$_2$CH$_2$O), 3.30-3.50 (m, 54H, OCH$_2$CH$_2$), 3.30-3.50 (m, 4H, NHCH$_2$CH$_2$CH$_2$O), 3.30 (t, 4H, CONHCH$_2$CH$_2$CH$_2$CH$_2$), 1.81 (m, 4H, NHCH$_2$CH$_2$CH$_2$O), 1.60-1.70 (m, 54H, OCH$_2$CH$_2$), 1.62 (m, 4H, CONHCH$_2$CH$_2$CH$_2$CH$_2$), 1.33 (m, 4H, CONHCH$_2$CH$_2$CH$_2$CH$_2$), 1.31 (m, 4H, CONHCH$_2$CH$_2$CH$_2$CH$_2$);

poly(bisoxalamide) (5): $^1$H NMR (300 MHz, CDCl$_3$-$d_1$) δ=7.83 (bt, 2H, OCH$_2$CH$_2$CH$_2$NHCO), 7.47 (bt, 2H, CONHCH$_2$CH$_2$CH$_2$CH$_2$CH$_2$), 3.48 (t, 4H, NHCH$_2$CH$_2$CH$_2$O), 3.30-3.50 (m, 54H, OCH$_2$CH$_2$), 3.30-3.50 (m, 4H, NHCH$_2$CH$_2$CH$_2$O), 3.29 (t, 4H, CONHCH$_2$CH$_2$CH$_2$CH$_2$CH$_2$), 1.80 (m, 4H, NHCH$_2$CH$_2$CH$_2$O), 1.60-1.70 (m, 54H, OCH$_2$CH$_2$), 1.59 (m, 4H, CONHCH$_2$CH$_2$CH$_2$CH$_2$CH$_2$), 1.33 (m, 4H, CONHCH$_2$CH$_2$CH$_2$CH$_2$CH$_2$), 1.31 (m, 4H, CONHCH$_2$CH$_2$CH$_2$CH$_2$CH$_2$), 1.31 (m, 4H, CONHCH$_2$CH$_2$CH$_2$CH$_2$CH$_2$).

The poly(bisoxalamides) (1) to (5) are characterized as having crystallizable segment content, $M_n$, and PDI as shown below in Table 1.

TABLE 1 characterization of poly(bisoxalamides) (1) to (5) of Examples 1 to 5

| Ex. No. | x | Average g | Crystallizable Segment Content (mol %) | $M_n$ (g/mol) | PDI |
|---|---|---|---|---|---|
| 1 | 1 | 11 | 15.4 | 22,700 | 8.65 |
| 2 | 2 | 11 | 17.2 | 30,300 | 10.00 |
| 3 | 3 | 11 | 18.9 | 41,200 | 9.05 |
| 4 | 4 | 11 | 20.5 | 30,000 | 10.28 |
| 5 | 5 | 11 | 22.1 | 31,900 | 8.53 |

Examples 6 to 11

Preparation of Poly(Bisoxalamides) (6) to (11)

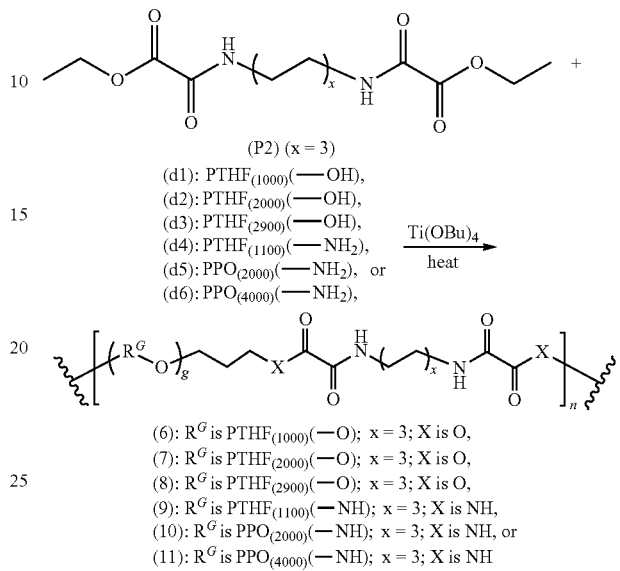

(P2) (x = 3)
(d1): PTHF$_{(1000)}$(—OH),
(d2): PTHF$_{(2000)}$(—OH),
(d3): PTHF$_{(2900)}$(—OH),
(d4): PTHF$_{(1100)}$(—NH$_2$),
(d5): PPO$_{(2000)}$(—NH$_2$), or
(d6): PPO$_{(4000)}$(—NH$_2$),

Ti(OBu)$_4$ heat (6): R$^G$ is PTHF$_{(1000)}$(—O); x = 3; X is O,
(7): R$^G$ is PTHF$_{(2000)}$(—O); x = 3; X is O,
(8): R$^G$ is PTHF$_{(2900)}$(—O); x = 3; X is O,
(9): R$^G$ is PTHF$_{(1100)}$(—NH); x = 3; X is NH,
(10): R$^G$ is PPO$_{(2000)}$(—NH); x = 3; X is NH, or
(11): R$^G$ is PPO$_{(4000)}$(—NH); x = 3; X is NH wherein integer g independently indicates a total number of the repeat units comprising R$^G$; PTHF means poly(tetrahydrofuran) (i.e., poly(butylene oxide)) and PPO means poly(propylene oxide), each having $M_n$ in grams per mole indicated in left set of parentheses and terminal functional groups indicated in right set of parentheses; wherein, when the starting materials and products are based on PTHF$_{(1000)}$(—OH), PTHF$_{(2000)}$(—OH) or PTHF$_{(2900)}$(—OH), then the CH$_2$CH$_2$CH$_2$X group in the product is missing; wherein, when the starting materials and products are based on PPO(2000)(—NH$_2$) or PPO(4000)(—NH$_2$), then the CH$_2$CH$_2$CH$_2$X group in the product is replaced with —CH$_2$CH(CH$_3$)NH; ⁓ denotes a radical and integer n independently indicates a total number of the repeat units comprising the poly(bisoxalamides) (6) to (11).

In an exemplary procedure for preparing poly(bisoxalamide) (6), charge a polymerization tube with hydroxy-terminated (—OH) PTHF having $M_n$ 2000 g/mol (30.00 g, 0.015 mol; (d1)) and 1 mole equivalent of bis(oxalic acid hemiamide-hemiester) (P2) (4.74 g, 0.015 mol). To the resulting premixture add 0.2 wt % (based on weight of (P2)) of Ti(OBu)$_4$ in 1 mL toluene and 1 wt % (based on total weight) of IRGANOX™ 1330. Heat to a temperature of 190° C. under nitrogen gas flow. After 1 hour, slowly decrease pressure to <20 mbar while distilling off ethanol, which is collected in a cold trap (liquid nitrogen cooled). Then place in vacuo for 4 hours, maintaining temperature at 190° C. (raise temperature for Examples 10 and 11 to 210° C.); final pressure is <0.08 mbar. Cool to room temperature under vacuum. Dissolve resulting polymer in 100 mL of chloroform at 50° C. for 4 hours, then add to diethyl ether (1 L) to precipitate poly(bisoxalamide) (6). Filter and dry the resulting filtercake at room temperature to give poly(bisoxalamide) (6).

Separately repeat above procedure five times, each time with a different one of (d2) to (d6), except as noted above, to respectively give poly(bisoxalamides) (7) to (11).

Examples 12 and 13

Preparation of Poly(Bisoxalamides) (12) and (13)

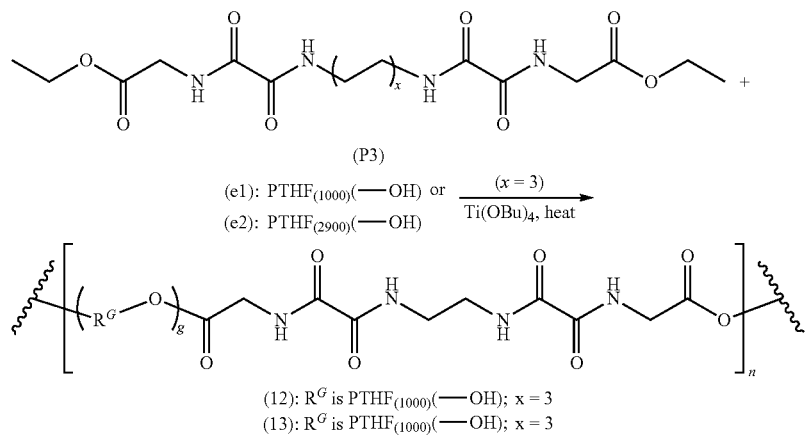

wherein integer g independently indicates a total number of the repeat units comprising $R^G$; and integer n independently indicates a total number of the repeat units comprising the poly(bisoxalamides) (12) and (13).

In an exemplary procedure for preparing poly(bisoxalamide) (12), charge a polymerization tube with hydroxy-terminated (—OH) PTHF having $M_n$ 1000 g/mol (24.61 g, 0.025 mol; (d1)) and 1 mole equivalent of bis(oxalic acid hemiamide-hemiester) (P3) (10.58 g, 0.025 mol; Preparation 3). To the resulting premixture add 0.2 wt % (based on weight of (P3)) of Ti(OBu)$_4$ in 1 mL toluene and 1 wt % (based on total weight) of IRGANOX™ 1330. Heat to a temperature of 150° C. under nitrogen gas flow, and then raise temperature by 30° C. every 30 minutes until it reaches 250° C. After 1 hour at 250° C., slowly decrease pressure to <0.1 mbar while distilling off ethanol, which is collected in a cold trap (liquid nitrogen cooled). Then place in vacuo for 1 hour; final pressure is <0.08 mbar. Cool to room temperature under vacuum. Dissolve resulting polymer in 100 mL of chloroform at 50° C. for 4 hours, then add to diethyl ether (1 L) to precipitate poly(bisoxalamide) (12). Filter and dry the resulting filtercake at 60° C. under reduced pressure to give poly(bisoxalamide) (12).

Separately repeat above procedure with (e2) to give poly(bisoxalamide) (13).

Crystallizable segment content for (12) is: 25.4 wt % with contribution of hard segment and 20.4 wt % without contribution of hard segment. Crystallizable segment content for (13) is 10.5 wt % with contribution of hard segment and 8.1 wt % without contribution of hard segment.

Examples A1 to A8

Dynamic Mechanical Properties and Compression Set Values

General: prepare compression molded plaques from poly(bisoxalamides) of the Examples using either Procedure 1 or 2 as described previously. Perform dynamic mechanical analysis and determine compression set values for the compression molded plaques as described previously. Results are reported below in Table 2.

TABLE 2 dynamic mechanical properties and compression set values of compression molded plaques of poly(bisoxalamides)*

| Ex. No. | Poly-(bisoxalamide) Example No. | Compression Molding Procedure No. | E (MPa) | $\sigma_y$ (MPa) | $\epsilon_y$ (%) | $\sigma_b$ (MPa) | $\epsilon_b$ (%) | CS (%) |
|---|---|---|---|---|---|---|---|---|
| A1 | 1 | 2 | 146 ± 20 | 12.3 ± 0.2 | 57 ± 2 | 11.7 | 700 | 18 ± 2 |
| A2 | 2 | 2 | 147 ± 21 | 13.8 ± 0.2 | 55 ± 3 | 19.7 | 770 | 25 ± 5 |
| A3 | 3 | 2 | 135 ± 7 | 12.7 ± 0.1 | 56 ± 2 | 27.5 | 860 | 24 ± 3 |
| A4 | 4 | 2 | 121 ± 18 | 13.0 ± 0.2 | 56 ± 3 | 24.5 | 850 | 24 ± 3 |
| A5 | 5 | 2 | 168 ± 9 | 13.5 ± 0.2 | 53 ± 3 | 19.2 | 720 | 34 ± 3 |
| A6 | 9 | 1 | 157 ± 13 | 13.0 ± 0.1 | 44 ± 2 | 16.3 | 703 | 24 ± 6 |
| A7 | 12 | 1 | 124 ± 16 | 11.1 ± 0.2 | 42 ± 2 | N/m | N/m | 41 ± 1 |
| A8 | 13 | 1 | 25 ± 1 | 3.5 ± 0.1 | 51 ± 1 | N/m | N/m | 19 ± 1 |

*E means Young's modulus; $\sigma_y$ means yield strength; $\epsilon_y$ means elongation at yield point; $\sigma_b$ means tensile strength at break; $\epsilon_b$ means elongation to break; CS means Compression Set; and N/m means not measured.

Figure 2:
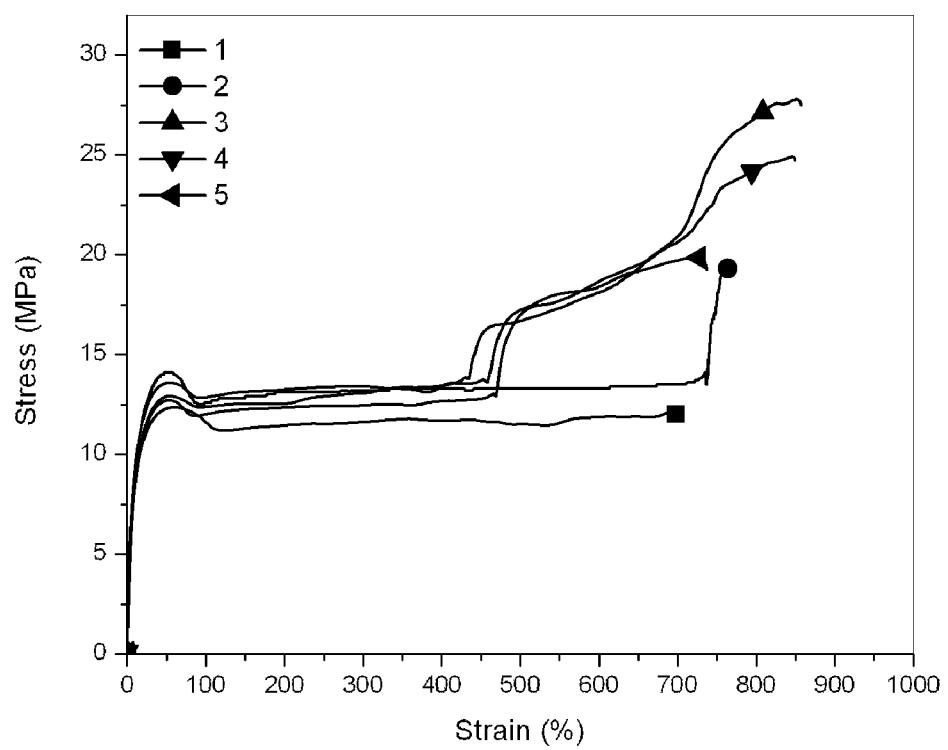
FIG. 2 shows stress-strain curves illustrating tensile properties of compression molded plaques for the poly(bisoxalamides) (1) to (5).

The poly(bisoxalamides) (1) to (5) are characterized as having torsional (dynamic) storage modulus (G') as illustrated by dynamic mechanical spectroscopy curves in FIG. 1 and tensile properties of their compression molded plaques as illustrated by the stress-strain curves in FIG. 2.

Figure 3:
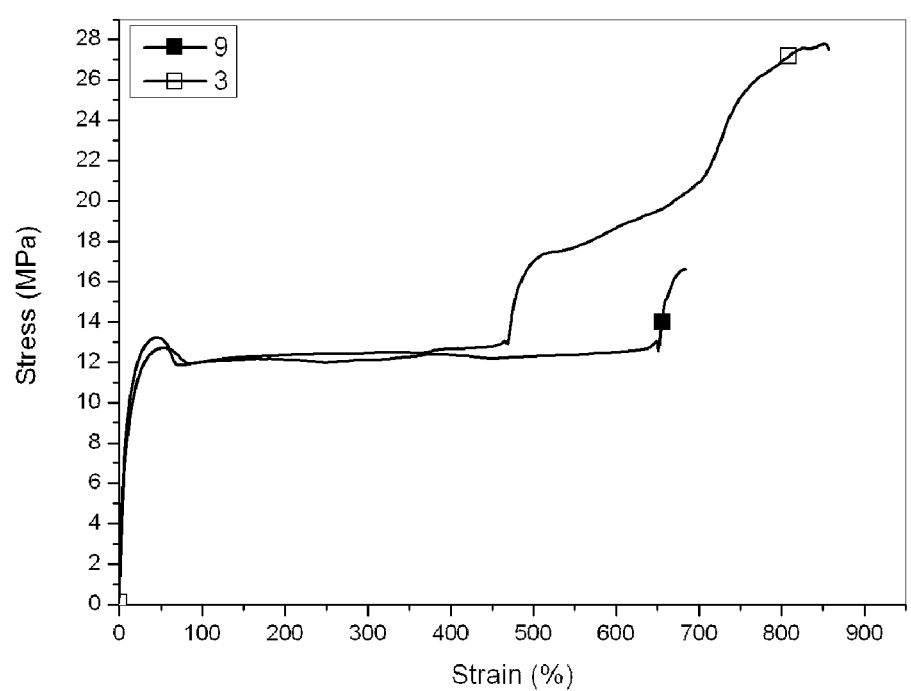
FIG. 3 shows stress-strain curves illustrating tensile properties of compression molded plaques for the poly(bisoxalamides) (3) and (9).

The poly(bisoxalamides) (3) and (9) are characterized as having tensile properties of their compression molded plaques as illustrated by the stress-strain curves in FIG. 3.

Figure 4:
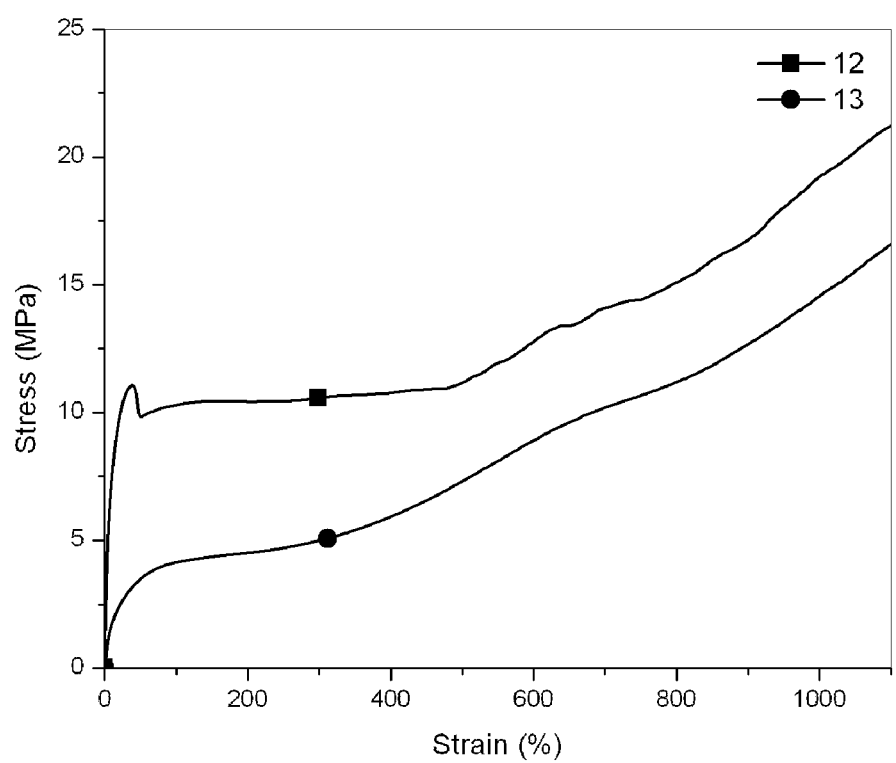
FIG. 4 shows stress-strain curves illustrating tensile properties of compression molded plaques for the poly(bisoxalamides) (12) and (13).

The poly(bisoxalamides) (12) and (13) are characterized as having tensile properties of their compression molded plaques as illustrated by the stress-strain curves in FIG. 4.

As shown in the Examples, the invention poly(bisoxalamides) have elastic properties of an elastomer and processability characteristics of a thermoplastic material. They possess improved properties such as, for example, being easily, and preferably reversibly, melt processable and yet exhibiting toughness and durability at application use temperatures. Further, in preferred embodiments the invention poly(bisoxalamides) are characterizable as having melt viscosity lower than nylons; consist of aliphatic backbone atoms; are derived from renewable monomers; or a combination thereof. The invention poly(bisoxalamides) are especially useful in, for example, foams, films, coatings, hot melt adhesives, fibers, fabrics, and articles comprising same, including extruded and molded articles.

While the invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. A poly(bisoxalamide) comprising a plurality of repeat units of formula (I):

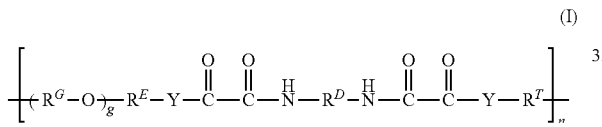

(I)

wherein for each repeat unit:

g independently is an integer of from 0 to 40 (when g is 0, —$R^G$—O— is absent);

$R^G$ independently is —$(CH_2)_m$—, —$(CHR^1)_m$—, where m is an integer of from 2 to 4 and $R^1$ is $(C_1$-$C_{10})$hydrocarbyl; —[C(=O)—$(CH_2)_b$]— where b is an integer 3 or 5; or —[C(=O)-A-C(=O)—O-D]— where A is a residual of a dicarboxylic acid and D is a residual of a diol;

Each of $R^E$ and $R^T$ is a diradical residual of an alpha-amino acid, beta-amino acid, gamma-amino acid, or alpha, omega-amino acid having from 5 to 40 carbon atoms;

$R^D$ independently is a diradical residual of an alpha, omega-diamine of from 2 to 40 carbon atoms;

Y is N(H); and n is an integer of 2 or higher, the integer n indicating a total number of the repeat units comprising the poly(bisoxalamide).

2. The poly(bisoxalamide) as in claim 1, the poly(bisoxalamide) comprising a plurality of repeat units of formula (Ia):

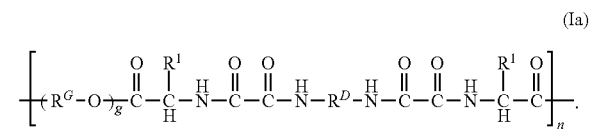

(Ia)

3. The poly(bisoxalamide) as in claim 1, the poly(bisoxalamide) comprising a plurality of repeat units of formula (Ib):

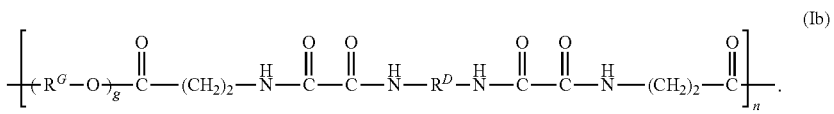

(Ib)

4. An article comprising the poly(bisoxalamide) as in claim 1.

* * * * *